May 27, 1952 A. W. HERRINGTON 2,598,166
REAR AXLE ARRANGEMENT FOR DELIVERY TRUCKS
Filed Aug. 7, 1948 3 Sheets-Sheet 1
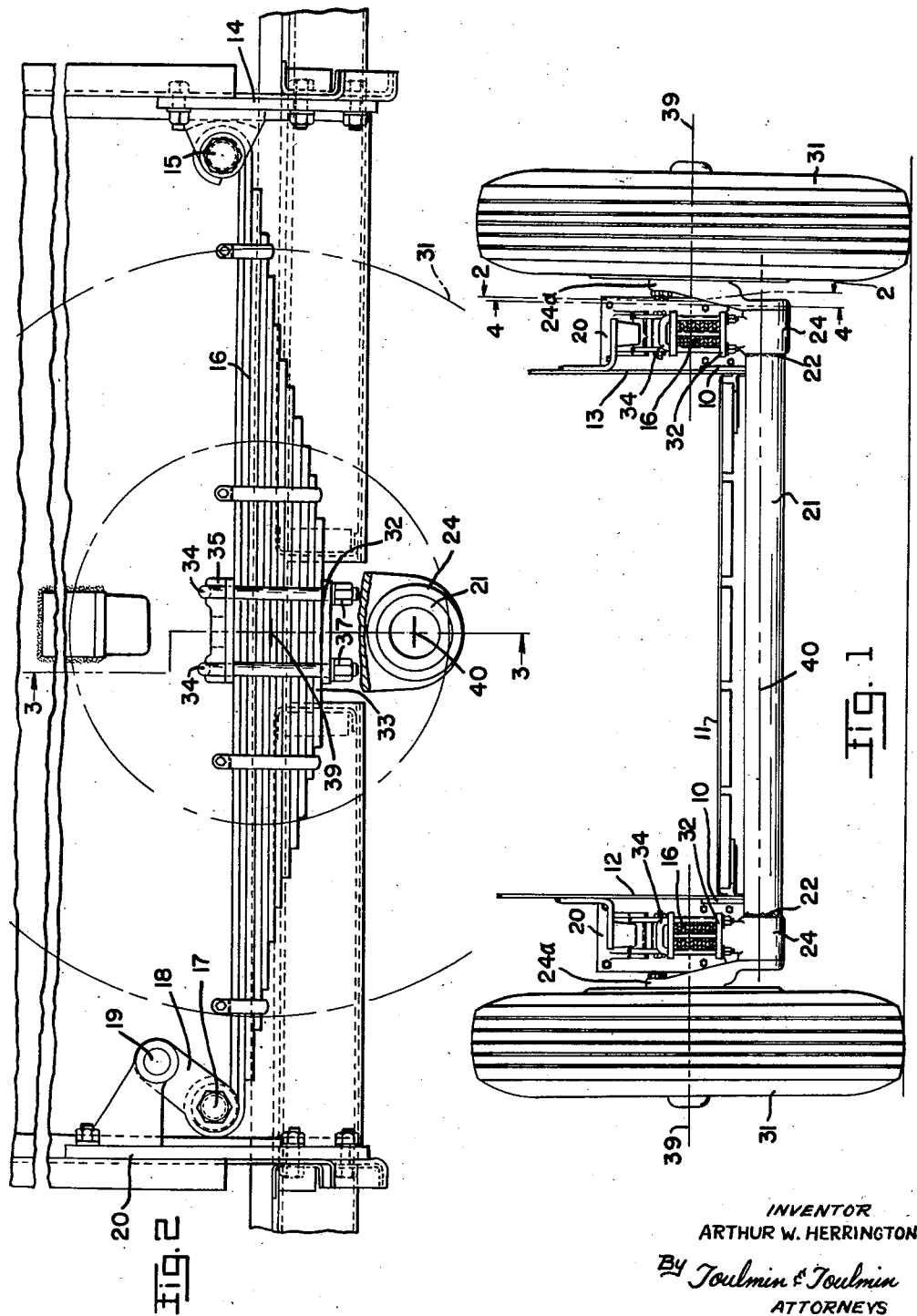
INVENTOR
ARTHUR W. HERRINGTON
By Toulmin & Toulmin
ATTORNEYS

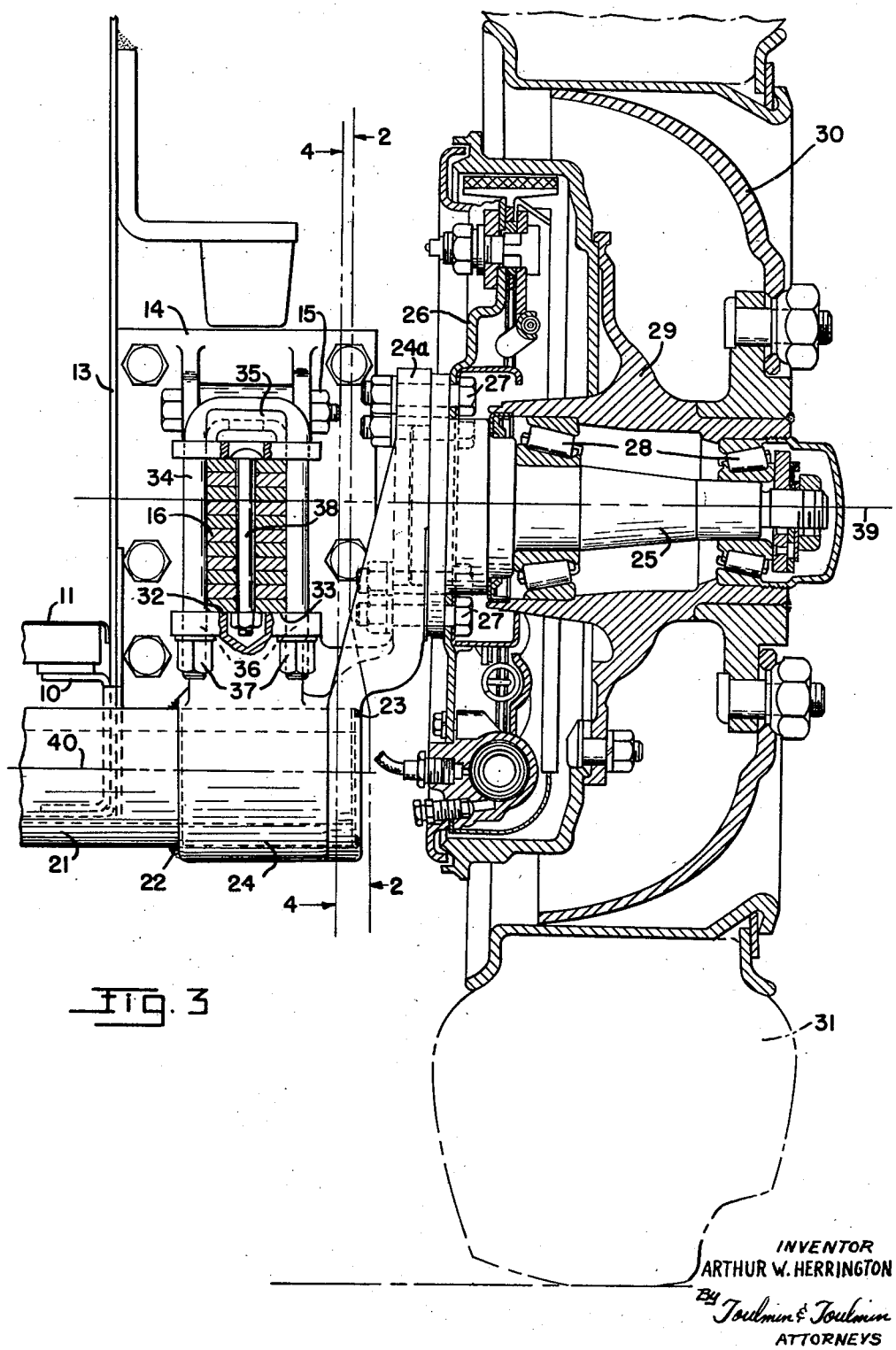

May 27, 1952   A. W. HERRINGTON   2,598,166
REAR AXLE ARRANGEMENT FOR DELIVERY TRUCKS
Filed Aug. 7, 1948   3 Sheets-Sheet 3
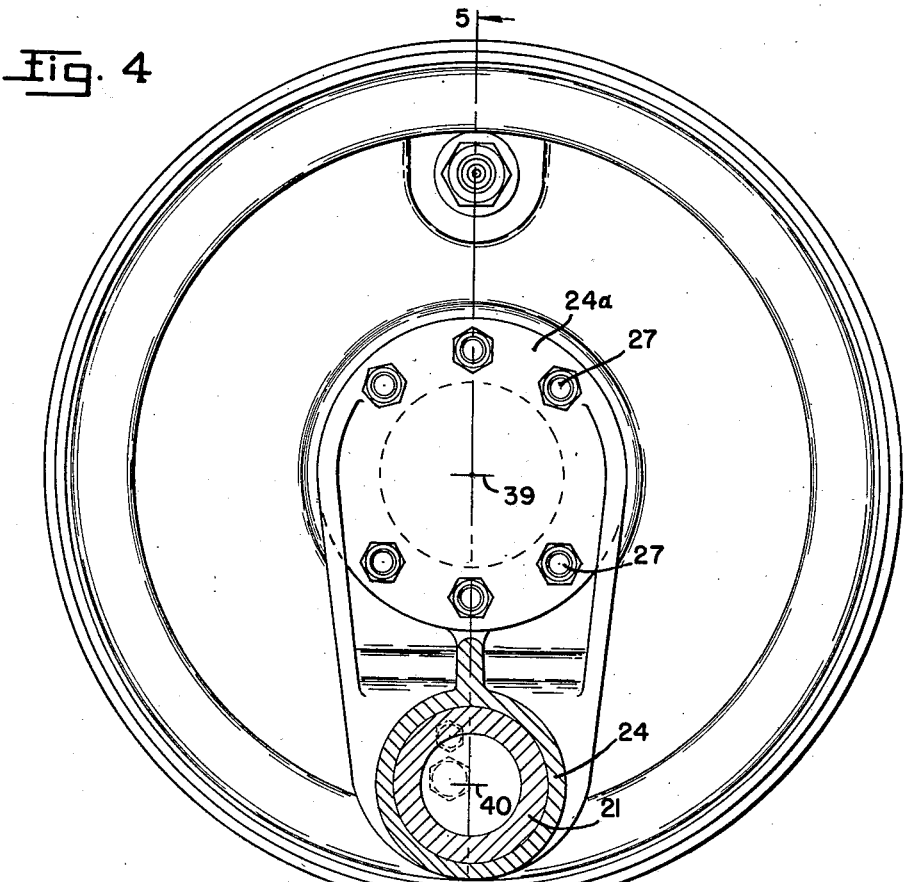
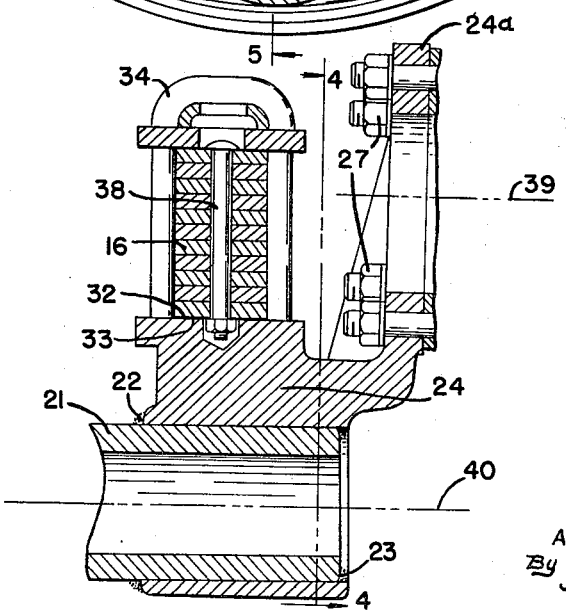
INVENTOR
ARTHUR W. HERRINGTON
By Toulmin & Toulmin
ATTORNEYS Patented May 27, 1952

2,598,166

UNITED STATES PATENT OFFICE 2,598,166

REAR AXLE ARRANGEMENT FOR DELIVERY TRUCKS

Arthur W. Herrington, Indianapolis, Ind., assignor to Marmon-Herrington Company, Inc., Indianapolis, Ind., a corporation of Indiana Application August 7, 1948, Serial No. 43,064

2 Claims. (Cl. 280—106.5)

This invention pertains to improvements in axles for automotive vehicles, particularly to improvements in the rear axle and spring arrangement for such vehicles. One of the difficult problems in automotive vehicles, such as trucks and delivery wagons, is to provide an axle structure which enables the bed of the truck to be located close to the ground so that the loads need not be raised very high for placement on the truck and so as to facilitate easy removal therefrom.

One of the objects of this invention is to provide a simplified and sturdy axle structure for an automotive vehicle enabling a low body or floor to be provided for carrying the load.

Still another object of this invention is to provide a rear axle structure for an automotive vehicle comprising a main tubular member extending transversely of the vehicle chassis, to which are attached the wheels in a vertically offset position, so that the axis of rotation of the wheels is far above said tubular member and passes through the leaf spring structure to which the tubular portion of the axle is connected through a novel mounting bracket.

Still another object of this invention is to provide in an automotive vehicle axle structure, including leaf springs at each side of the chassis, mounting brackets supporting the wheel spindles with their axes extending through the leaf springs and including a tubular member passing beneath the chassis and interconnecting said brackets for the wheel spindles at a level below said leaf springs.

Further features and advantages of this invention will appear from the detailed description of the drawings in which:

Figure 1 is a rear end view of a motor vehicle having an axle structure incorporating the features of this invention.

Figure 2 is an enlarged side elevation partly in section on the line 2—2 of Figures 1 and 3.

Figure 3 is a fragmentary enlarged section through a wheel spindle on the line 3—3 of Figure 2.

Figure 4 is an enlarged view on the line 4—4 in Figures 1, 3, and 5.

Figure 5 is a fragmentary section on the line 5—5 of Figure 4.

As an exemplary disclosure of this invention, there is illustrated in Figure 1 a motor vehicle frame 10 to which is attached a body 11 having side members 12 and 13, being interrupted immediately over the tubular member 21. Fixed to the frame 10 is the spring shackle supporting bracket 14, Figure 2, which carries the shackle bolt 15 to which one end of a conventional leaf spring 16 is pivotally mounted. The other end of the spring 16 is carried on a shackle bolt 17 and through the usual swinging link 18 and the shackle bolt 19 is connected to the spring shackle bracket 20 also fixed to the frame 10 of the vehicle.

The novel axle structure comprises a transverse tubular member 21 at each end of which are welded, as at 22 and 23, the brackets 24. The bracket 24 has an upwardly and outwardly extending flange portion 24a to which is mounted the wheel spindle 25 and brake accessories 26 by bolts 27 on the wheel spindle 25. On the usual bearings 28 are carried the motor vehicle hub 29, wheel 30 and tire 31.

On a lower portion of the bracket 24 is provided a spring pad 32 upon which rests the lower portion 33 of the leaf spring 16, which spring is rigidly held thereto by suitable U-bolts 34 which bear against the plate 35 on top of the spring 16 and pass through clearance holes 36 and are rigidly held in place by the nuts 37. The usual tie bolt 38 is provided to hold the spring leaves together for assembling or removing the spring 16 from the vehicle. It will be noted that the axes 39 of the wheel spindles 25 pass through the leaf springs 16, as best seen in Figure 3, and that these axes 39 of the wheels are well above the axis 40 of the tubular member 21 and that a single bracket member 24 is attached to carry both the wheel spindles and the supporting springs 16 for the vehicle by having the wheel spindle axes 39 well above the axis 40 of the tubular member 21. A very stable construction is provided, which prevents twisting and torque forces being adversely applied to the spring 16. At the same time there is provided a simple and efficient bracket arrangement for connecting the wheels to the springs while at the same time providing a transverse member interconnecting the two spring structures in such a way as to provide a maximum space and a low floor 11 for the vehicle.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appended claims are intended to be included herein.

Having thus fully set forth and described this invention, what is claimed as new and desired to be secured by United States Letters Patent is:

1. In a motor vehicle; a chassis comprising a longitudinal frame member at each side thereof and a body thereon having a flat bed, an axle structure having leaf springs longitudinally carried on each side of the body above the level of said bed, means for supporting a pair of road wheels on said springs comprising a single tubular member extending transversely underneath the vehicle chassis in a straight line beneath said bed, a pair of brackets one integral with each end of said tubular member and extending upwardly therefrom, a flat flange portion on the upper end of each of said brackets in a plane normal to the axis of said tubular member, a wheel spindle and brake assembly detachably mounted on said flange portion, a spring supporting pad integral with each of said brackets positioned directly over the connection of the bracket with said tubular member and adapted to engage under and to be clamped to said springs independently of the connection of the bracket with the tubular member so that the axis of said tubular member is located below the axis of rotation of the wheels about said wheel spindle, and said frame members being interrupted immediately over said tubular member to permit free springing of said axle structure.

2. In a motor vehicle; a chassis comprising a longitudinal frame member at each side thereof and a body thereon having a flat bed, an axle structure having leaf springs longitudinally carried on each side of the body above the level of said bed, means for supporting a pair of road wheels on said springs comprising a single tubular member extending transversely underneath the vehicle chassis in a straight line beneath said bed, a pair of brackets one integral with each end of said tubular member and extending upwardly therefrom, a flat flange portion on the upper end of each of said brackets in a plane normal to the axis of said tubular member, a wheel spindle and brake assembly detachably mounted on said flange portion, a spring supporting pad integral with each of said brackets positioned directly over the connection of the bracket with said tubular member and adapted to engage under and to be clamped to said springs independently of the connection of the bracket with the tubular member so that the axis of said tubular member is located below the axis of rotation of the wheels about said wheel spindle, and said frame members being interrupted immediately over said tubular member to permit free springing of said axle structure, said flange portion being formed with a bore on the axis of said spindle, and said spindle comprising a portion closely fitting said bore and a radial flange in face engagement with said flange portion of the bracket around the periphery of said bore.

ARTHUR W. HERRINGTON.

REFERENCES CITED

The following references are of record in the file of this patent:

UNITED STATES PATENTS

| Number | Name | Date |
|---|---|---|
| 950,980 | Winton et al. | Mar. 1, 1910 |
| 1,291,816 | Fielder | Jan. 21, 1919 |
| 1,306,685 | Cartwright | June 17, 1919 |
| 2,043,185 | Miesse | June 2, 1936 |
| 2,072,198 | Davis | Mar. 2, 1937 |
| 2,076,722 | Heinze | Apr. 13, 1937 |

FOREIGN PATENTS

| Number | Country | Date |
|---|---|---|
| 415,484 | France | July 13, 1910 |